United States Patent [19]

Arai et al.

[11] Patent Number: 4,686,117
[45] Date of Patent: Aug. 11, 1987

[54] METHOD OF FORMING A CARBIDE LAYER

[75] Inventors: Tohru Arai, Toyoake; Junji Endo, Nagoya, both of Japan

[73] Assignee: Kabushiki Kaisha Toyota Chuo Kenkyusho, Aichi, Japan

[21] Appl. No.: 913,643

[22] Filed: Sep. 30, 1986

Related U.S. Application Data

[63] Continuation of Ser. No. 733,843, May 14, 1985, abandoned.

[30] Foreign Application Priority Data

May 17, 1984 [JP] Japan .................................. 59-98993
Jun. 4, 1984 [JP] Japan .................................. 59-114034

[51] Int. Cl.$^4$ ............................................. B05D 7/24
[52] U.S. Cl. .................................. 427/249; 427/255.2; 427/255.4; 427/399
[58] Field of Search .................. 427/255.4, 399, 249, 427/255.2, 255; 118/717

[56] References Cited

U.S. PATENT DOCUMENTS 3,579,373  5/1971  Pingel .................................. 427/249
4,461,656  7/1984  Ross .................................. 148/16.6

FOREIGN PATENT DOCUMENTS 107990  6/1984  Japan .................................. 427/249

Primary Examiner—Shrive P. Beck
Attorney, Agent, or Firm—Berman, Aisenberg & Platt

[57] ABSTRACT

A method of forming a layer of the carbide of titanium, vanadium, etc. on the surface of an article containing carbon by employing a fluidized bed furnace. The formation of the layer is effected by disposing in the furnace a coating agent prepared from a refractory powder, a carbide forming powder composed of at least one carbide forming metal or alloy and a halide powder, and the article, and introducing a fluidizing gas into the furnace under heat to fluidize the agent. This method enables the safe and rapid formation of a carbide layer having a uniform thickness and smooth surface.

26 Claims, 11 Drawing Figures

METHOD OF FORMING A CARBIDE LAYER

RELATED APPLICATION

This application is a continuation of Ser. No. 733,843, filed May 14, 1985, now abandoned.

BACKGROUND OF THE INVENTION

1. Field of the Invention:

This invention relates to a method for the surface treatment of a material containing carbon, and more particularly, to a method of forming a layer of the carbide of titanium (Ti), vanadium (V), niobium (Nb), tantalum (Ta), chromium (Cr), molybdenum (Mo), tungsten (W) or manganese (Mn), which will hereinafter be referred to as the carbide forming element, on the surface of the material in a fluidized bed furnace.

2. Description of the Prior Art:

A fluidized bed furnace having (as a heat medium) a fluidized bed which is formed by blowing air, argon or other gas into alumina powder is used for the heat treatment of steel. This heat medium enables the uniform and rapid heating of the material to be treated, since it has a uniform temperature distribution and transfers heat rapidly.

Figure 2:
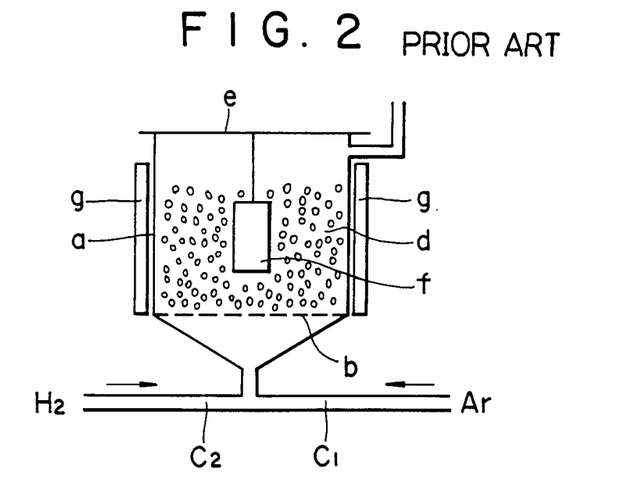
FIG. 2 is a schematic view of the furnace which has been used for carrying out the conventional method.

An attempt has been made to use such a fluidized bed furnace for the diffusion coating of the metal surface, as will now be described with reference to FIG. 2. A coating agent in the form of a mixed powder composed of a substance containing a cementing metal and an inert substance, such as alumina, is placed on a diffusion plate b in the main body a of a fluidized bed furnace. An inert gas, such as argon (Ar), is introduced into the main body a through a gas supply passage $c_1$ to fluidize the powder to form a fluidized bed d. The top cover e of the main body a is opened, the material f to be treated is buried in the fluidized bed d and the cover a is closed. The utmost care is required to ensure that the furnace is closed tightly. Halogen, vapor, as an activator, is introduced with hydrogen, as a carrier gas into the fluidized bed d through a gas supply passage $c_2$. The halogen vapor and the powder of the cementing metal react with each other to generate a gas of the halide of the cementing metal. The halide gas is decomposed upon contacting the material f in the fluidized bed d to deposit the cementing metal on the surface of the material.

This method and the furnace used for carrying it out have, however, a number of inconveniences as will be pointed out. Firstly, halogen vapor as an activator is necessary and, hydrogen, use of which is essential for carrying the halogen vapor, is highly explosive and requires a lot of care to ensure the gastightness of the piping and the furnace. The operation of the furnace is, therefore, not always efficient. Secondly, it is impossible to take out the coated material from the furnace while it is still at a high temperature, since the furnace need be kept tightly closed so that no explosion of hydrogen may occur. Therefore, it is difficult to harden the material immediately after it has been coated. Thirdly, an apparatus is required for generating the halogen vapor, thus making the furnace complicated both in construction and in operation.

SUMMARY OF THE INVENTION

It is an object of this invention to provide a surface treating method which can rapidly and safely form a carbide layer having a uniform and practical acceptable thickness and a smooth surface by employing a fluidized bed furnace without using any hydrogen or halogen vapor.

It is another object of this invention to provide a method for the formation of a carbide layer which can be carried out by a fluidized bed furnace which is simple in construction and easy to operate.

According to this invention, there is provided a method of forming a carbide layer on the surface of a material containing carbon, which comprises disposing in a fluidized bed furnace a coating agent comprising a refractory powder, such as alumina, a carbide-forming powder composed of at least one carbide-forming metal or alloy and a halide powder composed of at least one of a halogenated ammonium salt and a metal halide which is sublimable or vaporizable at a temperature not more than a treating temperature employed for the formation of a carbide layer, and the material to be treated, and introducing a fluidizing gas into the furnace under heat to fluidize the coating agent to treat the surface of the material.

These and other objects, features and advantages of this invention will become apparent from the following description and the accompanying drawings.

DETAILED DESCRIPTION OF THE INVENTION

According to this invention, it is possible to use any fluidized bed furnace of the type which is usually used for drying, incineration, reduction or other purposes.

The refractory material is used to prevent the carbide forming powder from forming a mass during its fluidzation. It is preferable to select a refractory material which does not react with the carbide forming powder. More specifically, it is appropriate to use alumina ($Al_2O_3$), silicon oxide ($SiO_2$), titanium oxide ($TiO_2$), zirconia ($ZrO_2$) or other refractories that do not easily undergo any change in quality at a temperature employed for forming a carbide layer (treating temperature). It is possible to use one or more of them together.

The carbide-forming metal is a metal which easily combines with carbon to form a carbide. Typical examples are titanium of Group IVb, vanadium, niobium and tantalum of Group Vb, chromium, molybdenum and tungsten of Group VIb and manganese of Group VIIb. Ferroalloys, such as Fe-V, Fe-Nb and Fe-Cr, are examples of the carbide-forming alloy which are often used on an industrial basis.

It is possible to employ a mixture of two or more carbide forming metals or alloys in order to form a composite carbide layer or two or more carbide layers.

The coating agent preferably contains 5 to 50% by weight of the carbide-forming powder, i.e., the powder of the carbide-forming metal or alloy. If its content is less than 5% by weight, it is difficult to form a carbide layer. The addition of more than 50% by weight should be avoided, as it results in the adherence of the metal powder.

The halogenated ammonium salt may, for example, be ammonium chloride ($NH_4Cl$), ammonium bromide ($NH_4Br$), ammonium iodide ($NH_4I$) or ammonium fluoride ($NH_4F$). It is also possible to use a mixture of one or more salts. The metal halide which is sublimable or vaporizable at or below the treating temperature may, for example, be titanium fluoride ($TiF_4$), niobium fluoride ($NbF_4$), vanadium fluoride ($VF_3$), iron chloride ($FeCl_3$), molybdenum chloride ($MoCl_5$), niobium chloride ($NbCl_5$), vanadium chloride ($VCl_3$), titanium bromide ($TiBr_4$) or niobium bromide ($NbBr_3$). It is possible to use a mixture of one or more such halides. It is important to avoid the use of any metal halide that is not sublimable or vaporizable at or below the treating temperature, since it is likely to melt in the fluidized bed, making its fluidization difficult, and also to adhere to the material to be treated. The halide powder may comprise the halogenated ammonium salt or the metal halide, or both.

The halide powder reacts with the carbide-forming powder and generates a gas of the halide of the carbide-forming element. If a halide of a carbide-forming element, such as $TiF_4$ or $VCl_3$, is used, it directly serves to form a carbide. The coating agent preferably contains 0.2 to 3% by weight of the halide powder. If its content is less than 0.2% by weight, it is difficult to form a carbide layer having a satisfactory thickness. The addition of more than 3% by weight should also be avoided, as an increase in the generation of the halide gas is likely to cause a lot of trouble, including the clogging of the exhaust port.

The coating agent, which consists essentially of the refractory powder, carbide forming powder and halide powder, preferably has a grain size of 60 to 350 mesh. If it is coarser than 60 mesh, it requires an undesirably large amount of gas for fluidization. If too large an amount of fluidizing gas is employed, it blows away the halide gas and disables it to reach the surface to be coated, resulting in the failure to form a carbide. The use of a coating agent having a grain size finer than 350 mesh should also be avoided, as its flotation makes it difficult to handle.

Under certain circumstances, it is possible that the coating agent may close the inlet of the fluidizing gas and fail to be properly fluidized. This problem can be solved if coarse particles of alumina or other refractory material having a grain size of 5 to 20 mesh are disposed between the gas inlet and the coating agent.

An inert gas which does not react with the coating agent is used for fluidizing it. Argon (Ar) of ordinary purity may be the most typical fluidizing gas. The fluidizing gas having an appropriate pressure is introduced into the furnace at an appropriate flow rate to blow up the coating agent and keep it in a floating state to thereby form a fluidized bed. If its flow rate is low, a small amount of the coating agent is likely to adhere to the surface of the material to be treated, and must be removed by, for example, a wire brush. It is, therefore, desirable to maintain a flow rate of at least 50 cm per minute in the furnace to avoid the adhesion of the powder to the surface of the material and form a smooth coating layer thereon. It should, however, not exceed 700 cm per minute, since a higher flow rate would result in the heavy fluidization and bubbling which complicates the operation. A flow rate of 60 to 600 cm per minute is preferred to achieve appropriate fluidization and easy operation. The fluidizing gas preferably has a pressure of 0.5 to 2 $kg/cm^2$ at its inlet to the furnace.

According to this invention, it is possible to treat a material containing carbon, for example, a metal, such as iron, nickel or cobalt, containing carbon, or these alloys, or a cemented carbide, or a carbonaceous material, such as graphite. The carbon which the material to be treated contains and the carbide-forming element in the coating agent combine to form a carbide of the carbide-forming element on the surface of the material to be treated. It is preferable for the material to be treated to contain at least 0.1% by weight of carbon. If its carbon content is less than 0.1% by weight, it may be difficult to form a carbide layer, or it may take a long time to form a carbide layer having a practically acceptable thickness.

It is also possible to supply the necessary carbon from an external source. In this connection, it will be effective to add to the fluidizing gas a gas containing carbon, for example, a hydrocarbon gas.

It is possible to form a carbide containing nitrogen if the material to be treated is nitrided prior to its treatment by the method of this invention.

The fluidized bed is heated to provide a heat medium for the material to be treated. It can be heated by an electric furnace or other heating apparatus in which the fluidized bed furnace per se is placed, or by a heater provided in the fluidized bed furnace. The heated fluidized bed heats the material with which it is brought into contact, and thereby forms a carbide layer on its surface.

The treating temperature ranges from 700° C. to 1200° C. If it is lower than 700° C., no carbide layer having a satisfactory thickness can be formed on the surface of the material. The use of a temperature exceeding 1200° C. should also be avoided, as it is likely to result in the formation of the coating agent into a mass or the worsening in quality of the material to be treated.

The treating time ranges from 0.5 to 16 hours, depending on the thickness of the carbide layer to be formed and the nature of the material to be treated. If the heating time is shorter than 0.5 hour, it is sometimes impossible to form a carbide layer having a satisfactory thickness. If it exceeds 16 hours, the material to be treated is likely to worsen in quality. In order to obtain a carbide layer having a particular thickness, a relatively short period of time is usually sufficient for treatment at a high temperature, but a relatively long period of time is required for treatment at a low temperature.

The fluidizing gas may be introduced into the furnace after the furnace has been charged with the coating agent and the material to be treated, and heated. It is possible to reverse the order and heat the furnace after introducing the fluidizing gas. It is also possible to charge the furnace after heating it and introducing the fluidizing gas thereinto.

The method of this invention employs the halogenated ammonium salt or metal halide powder for the coating agent, and does not require any halogen vapor. Therefore, it does not require any hydrogen as a carrier gas for carrying the halogen vapor, but enables the carbide coating treatment to be carried out safely without involving any danger of hydrogen explosion. The absence of hydrogen also enables the material to be treated to be directly placed in the hot fluidized bed and heated rapidly. The method of this invention can, therefore, be carried out by a fluidized bed furnace which is simple in construction and easy to operate. The fluidized coating agent, which is used as a heat medium, does not adhere to the surface of the material to be treated. The material treated by the method of this invention, therefore, has a smooth surface.

If the flow rate of the fluidizing gas is too low, a slight amount of the coating agent, such as the metal powder, is likely to adhere to the surface of the material to be treated. This is particularly the case if the material to be treated is, for example, an object having a complicated shape or a punch having a small hole. The removal of the adhering powder is a time-consuming job. It is, therefore, important to maintain a flow rate of at least 50 cm per minute in the fluidized bed furnace in order to prevent the adhesion of the powder to the surface of the material to be treated and obtain a smooth treated surface.

According to this invention, the fluidized bed has a uniform temperature distribution and thereby enables the formation of a carbide layer having a uniform thickness on the surface of the material to be treated. It is easy to form a composite carbide layer or two or more carbide layers if the coating agent contains a mixture of two or more carbide forming metals.

The invention will now be described more specifically with reference to a plurality of examples thereof.

EXAMPLE 1

Figure 1:
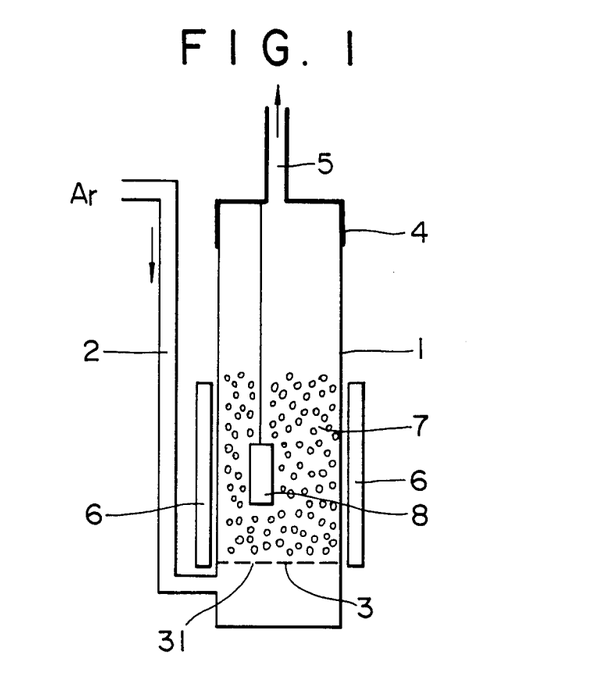
FIG. 1 is a schematic view of the furnace which is used for carrying out a method embodying this invention.

The method of this invention was carried out by using the fluidized bed furnace shown in FIG. 1. The furnace comprises a main body 1 having at its bottom a gas inlet to which a gas supply passage 2 is connected. A diffusion plate 3 is provided immediately above the gas inlet and divides the interior of the furnace into two chambers. The diffusion plate 3 has a multiplicity of gas diffusing holes 31. The furnace body 1 is provided at its top with a removable lid 4 having a gas outlet 5. A heater 6 is disposed around the furnace body 1. The furnace body 1 comprises a cylindrical shell made of heat resistant steel and having a diameter of 60 mm and a height of 800 mm.

One kilogram of the coating agent was placed on the diffusion plate 3. The coating agent contained 59.5% by weight of alumina powder having a grain size of 80 to 100 mesh, 40% by weight of ferrovanadium powder containing 70% by weight of vanadium and having a grain size of 100 to 200 mesh and 0.5% by weight of ammonium chloride powder having a grain size of 80 to 200 mesh. Argon gas was introduced into the furnace body 1 through the gas supply passage 2 to form a fluidized bed 7 of the coating agent. The gas was supplied so that it might have a pressure of 1.5 kg/cm$^2$ at the gas inlet and a flow rate of 70 cm per minute in the furnace.

The cover 4 was removed from the furnace body 1, and the material 8 to be treated was suspended by a hanger and placed in the fluidized bed 7. It was an alloy tool steel bar disposed vertically and having a diameter of 7 mm and a height of 200 mm. The steel was of the type designated by Japanese Indusrial Standard (JIS) SKD11. The fluidized bed 7 was heated to 950° C. by the external heater 6. The material 8 was heated at 950° C. for two hours and allowed to cool.

Figure 3:
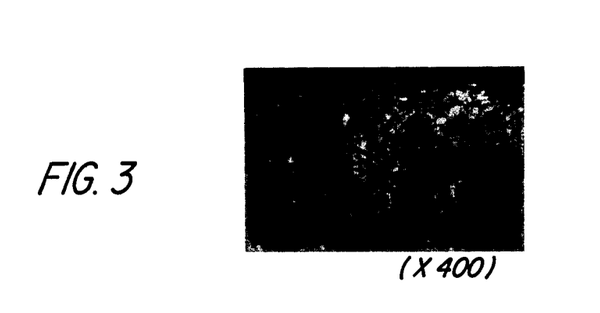
FIG. 3 is a microphotograph of 400 magnifications showing by way of example the cross sectional metallic structure of the carbide layer formed by the method of this invention.

The surface of the material as treated was visually inspected. No adherence of the coating agent was found. No unevenness in color was found, either. It was a smooth surface having a metallic luster. A microscopic inspection of its cross section revealed a uniform coating layer having a thickness of 5 to 6 μm as shown in FIG. 3. The X-ray diffraction of the layer showed that it was a layer of vanadium carbide (VC). It was found to have a Vickers' hardness of about 3500.

A carbide coating was formed on the same material (designated by JIS SKD11) by the same method, except that argon gas had a flow rate of 35 cm per minute in the furnace. A layer of vanadium carbide having a thickness of 5 to 6 μm was formed on the surface of the material. This layer had, however, a surface carrying particles of the coating agent, and which was, therefore, not satisfactorily smooth.

EXAMPLE 2

Figure 4:
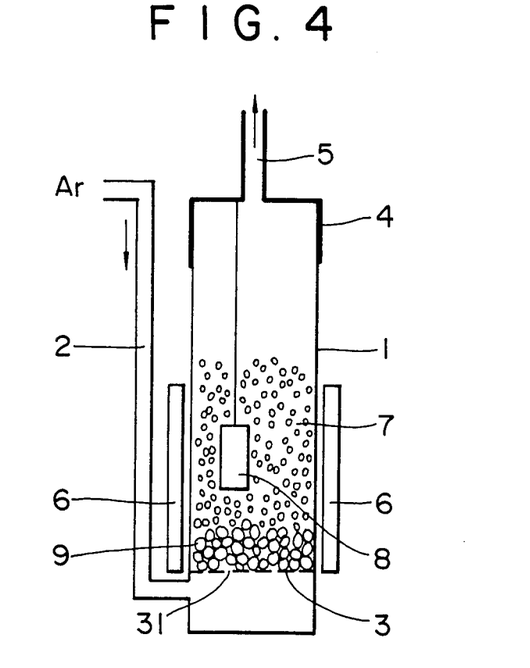
FIG. 4 is a schematic view of the furnace which is used for carrying out a modified method embodying this invention.
Figure 5:
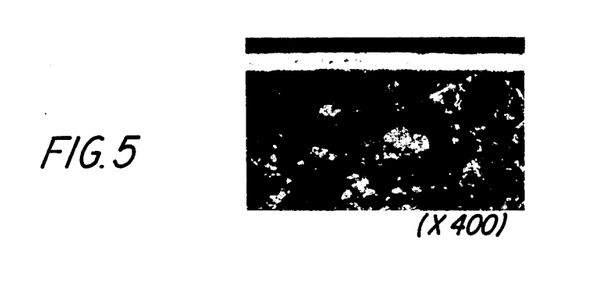
FIGS. 5 to 11 are also microphotographs of 400 magnifications (the photograph of FIG. 6 being of 200 magnifications) showing by way of example the cross sectional metallic structures of the carbide layers formed by the method of this invention.

A fluidized bed 7 was formed by repeating the procedure of EXAMPLE 1, except that 500 g of coarse particles 9 of alumina having a size of 5 to 20 mesh were placed between the diffusion plate 3 and the coating agent, as shown in FIG. 4, and that the fluidizing argon gas had a pressure of 1.5 kg/cm$^2$ at the gas inlet and a flow rate of 500 cm per minute in the furnace. The coarse particles 9 were employed for preventing the clogging of the diffusing holes 31 by the coating agent to improve the distribution of the fluidizing gas. The procedure of EXAMPLE 1 was repeated for forming a carbide coating on a bar 8 of carbon tool steel having a diameter of 8 mm and a height of 200 mm. The steel was of the type designated by JIS SK4. The material as treated had a very smooth surface which was completely free from any adhering particle of the coating agent. A microscopic examination of its cross section revealed a uniform coating layer having a thickness of 10 μm, as shown in FIG. 5. The X-ray diffraction of the layer confirmed that it was a layer of vanadium carbide.

The procedure as hereinabove described was repeated for forming a carbide coating on graphite. As a result, a smooth layer of vanadium carbide having a thickness of 6 to 7 μm was formed on the graphite surface.

EXAMPLE 3

One kilogram of coating agent was prepared for forming a carbide coating on carbon tool steel (JIS SK4) by repeating the procedure of EXAMPLE 2. The coating agent contained 10% by weight of ferrovanadium powder containing 70% by weight of vanadium and having a grain size of 100 to 150 mesh and 1% by weight of ammonium chloride powder having a grain size of 80 to 100 mesh, the balance being alumina powder having a grain size of 80 to 100 mesh. A smooth layer of vanadium carbide having a thickness of 8 to 10 μm was formed on the steel surface.

A test was conducted by repeating the same procedure and employing the same coating agent except that the proportion of the ferrovanadium powder therein was increased to 50% by weight. As a result, a smooth layer of vanadium carbide having a thickness of 8 to 10 μm was formed on the steel surface.

EXAMPLE 4

Figure 6:
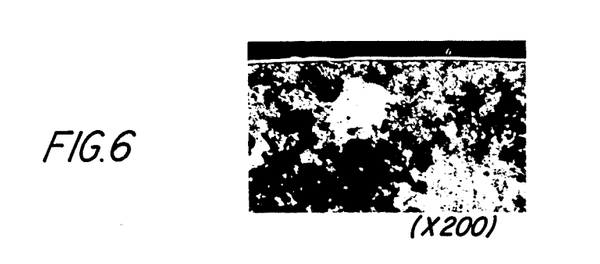

One kilogram of coating agent was prepared so that it might contain 45% by weight of ferrotitanium powder containing 45% by weight of titanium and having a grain size of 100 to 150 mesh and 2.5% by weight of ammonium chloride powder having a grain size of 100 to 200 mesh, the balance being alumina powder having a grain size of 60 to 100 mesh. It was fluidized by argon gas having a pressure of 1.5 kg/cm$^2$ at the gas inlet to the furnace and a flow rate of 350 cm per minute in the furnace. It was used for coating alloy tool steel ( JIS SKD11 ) by repeating the procedure of EXAMPLE 2. As a result, a smooth coating layer having a thickness of 5 to 6 μm was formed on the steel surface, as shown by the microphotograph of FIG. 6. The X-ray diffraction of the layer confirmed that it was a layer of titanium carbide (TiC). It was found to have a Vickers' hardness of about 3000.

The same coating agent and procedure were employed for coating a cemented carbide(WC containing 6% by weight of cobalt). As a result, a layer of titanium carbide having a thickness of 1 to 2 μm was formed on the alloy surface.

EXAMPLE 5

Figure 7:
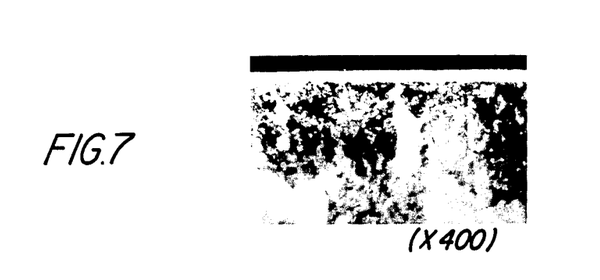

One kilogram of coating agent was prepared so that it might contain 40% by weight of chromium powder having a grain size of 100 to 150 mesh and 1% by weight of ammonium bromide powder having a grain size of 80 to 150 mesh, the balance being alumina powder having a grain size of 80 to 100 mesh. It was used for coating carbon tool steel (JIS SK4) by repeating the procedure of EXAMPLE 2. As a result, a smooth coating layer having a thickness of 7 to 8 μm was formed on the steel surface, as shown by the microphotograph of FIG. 7. The X-ray diffraction of the layer confirmed that it was a layer of chromium carbide. It was found to have a Vickers' hardness of about 1500.

EXAMPLE 6

One kilogram of coating agent was prepared so that it might contain 50% by weight of ferroniobium powder containing 65% by weight of niobium and 3.4% by weight of tantalum and having a grain size of 100 to 150 mesh and 2.5% by weight of ammonium chloride powder having a grain size of 100 to 200 mesh, the balance being alumina powder having a grain size of 80 to 100 mesh. It was fluidized by argon gas having a pressure of 2 kg/cm$^2$ at the gas inlet to the furnace and a flow rate of 70 cm per minute in the furnace. The fluidized coating agent was used for coating alloy tool steel ( JIS SKD11 ) by repeating the procedure of EXAMPLE 2. As a result, a smooth coating layer having a thickness of 2 to 3 μm was formed on the steel surface. The X-ray diffraction of the layer confirmed that it was a layer of niobium carbide (NbC). The elemental analysis of the layer by an X-ray microanalyzer revealed the presence of tantalum in addition to niobium and carbon. The layer was found to have a Vickers' hardness of about 2500.

EXAMPLE 7

The procedure of EXAMPLE 1 was repeated for coating carbon tool steel ( JIS SK4) by employing 1 kg of coating agent containing 35% by weight of ferromanganese powder having a manganese content of 77% by weight and a grain size of 100 to 200 mesh and 3% by weight of ammonium chloride powder having a grain size of 80 to 150 mesh, the balance being alumina powder having a grain size of 80 to 100 mesh. As a result, a smooth coating layer having a thickness of 7 to 8 μm was formed on the steel surface. The X-ray diffraction of the layer confirmed that it was a layer of manganese carbide (Mn$_5$C$_2$). It had a Vickers' hardness of about 1400.

EXAMPLE 8

Figure 8:
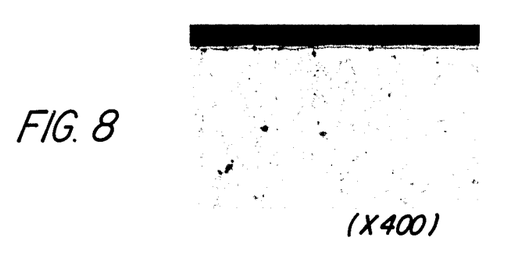

One kilogram of coating agent was prepared so that it might contain 20% by weight of ferrotitanium powder containing 45% by weight of titanium and having a grain size of 100 to 150 mesh and 2.5% by weight of titanium fluoride (TiF$_4$) powder having a grain size of 80 to 200 mesh, the balance being alumina powder having a grain size of 80 to 100 mesh. It was fluidized by argon gas having a pressure of 1.5 kg/cm$^2$ at the gas inlet to the furnace and a flow rate of 50 cm per minute in the furnace. The fluidized coating agent was used for coating a bar of alloy tool steel ( JIS SKD11) having a diameter of 7 mm and a height of 200 mm by repeating the procedure of EXAMPLE 2. The steel surface as treated was visually inspected. It was a smooth surface which was free from any adhering particle of the coating agent. A microscopic examination of its cross section revealed a uniform coating layer having a thickness of 2 to 3 μm, as shown by the microphotograph of FIG. 8. The X-ray diffraction of the layer confirmed that it was a layer of titanium carbide (TiC). It was found to have a Vickers' hardness of about 3000.

The same coating agent and procedure were employed for coating graphite. As a result, a smooth layer of titanium carbide having a thickness of 6 to 7 μm was formed on the graphite surface.

EXAMPLE 9

Figure 9:
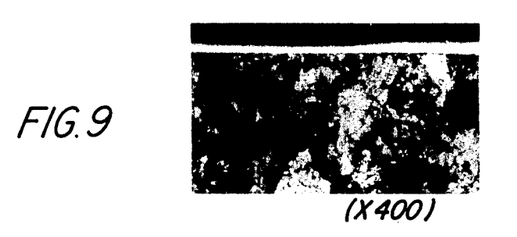

One kilogram of coating agent was prepared so that it might contain 30% by weight of ferrovanadium powder containing 70% by weight of vanadium and having a grain size of 100 to 200 mesh and 1% by weight of vanadium chloride (VCl$_3$) powder having a grain size of 80 to 200 mesh, the balance being alumina powder having a grain size of 80 to 100 mesh. It wa fluidized by argon gas having a pressure of 1.5 kg/cm$^2$ at the gas inlet to the furnace and a flow rate of 100 cm per minute in the furnace. The fluidized coating agent was used for coating a bar of carbon tool steel ( JIS SK4) having a diameter of 8 mm and a height of 200 mm by repeating the procedure of EXAMPLE 2. The steel as treated had a very smooth surface which was completely free from any adhering particle of the coating agent. A microscopic examination of its cross section revealed a uniform coating layer having a thickness of 5 to 6 μm, as shown by the microphotograph of FIG. 9. The X-ray diffraction of the layer confirmed that it was a layer of vanadium carbide (VC). It was found to have a Vickers' hardness of about 3500.

Tne same coating agent and procedure were employed for coating a cemented carbide (WC containing 6% by weight of cobalt). As a result, a layer of vanadium carbide having a thickness of 1 to 2 μm was formed on the alloy surface.

EXAMPLE 10

One kilogram of coating agent was prepared so that it might contain 40% by weight of ferrovanadium powder containing 70% by weight of vanadium and having a grain size of 100 to 200 mesh and 3% by weight of iron chloride (FeCl$_3$) powder having a grain size of 80 to 200 mesh, the balance being alumina powder having a grain size of 80 mesh. It was fluidized by argon gas having a pressure of 1.5 kg/cm$^2$ at the gas inlet to the furnace and a flow rate of 100 cm per minute. The fluidized coating agent was used for coating a bar of carbon steel ( JIS S45C ) by repeating the procedure of EXAMPLE 2. The bar had a diameter of 8 mm and a height of 100 mm. The steel as treated had a very smooth surface which was completely free from any adhering particle of the coating agent. A microscopic examination of its cross section revealed a uniform coating layer having a thickness of 8 to 10 $\mu$. The X-ray diffraction of the layer confirmed that it was a layer of vanadium carbide (VC).

EXAMPLE 11

Figure 10:
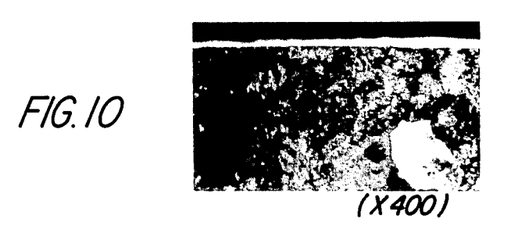

One kilogram of coating agent was prepared so that it might contain 20% by weight of ferrovanadium powder containing 70% by weight of vanadium and having a grain size of 100 to 200 mesh and 3% by weight of titanium fluoride (TiF$_4$) powder having a grain size of 80 to 200 mesh, the balance being alumina powder. It was fluidized by argon gas having a pressure of 1.5 kg/cm$^2$ at the gas inlet to the furnace and a flow rate of 200 cm per minute in the furnace. The fluidized coating agent was used for coating carbon tool steel ( JIS SK4) by repeating the procedure of EXAMPLE 2. The steel as treated had a very smooth surface which was completely free from any adhering particle of the coating agent. A microscopic examination of its cross section revealed a uniform coating layer having a thickness of 5 to 6 $\mu$m, as shown by the microphotograph of FIG. 10. The X-ray diffraction of the layer and its analysis by an X-ray microanalyzer confirmed the presence of an outer layer of vanadium carbide (VC) and an inner layer of titanium carbide (TiC). The titanium carbide was apparently formed by the titanium in the metal halide employed.

EXAMPLE 12

Figure 11:
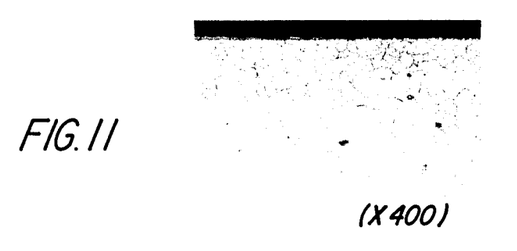

One kilogram of coating agent was prepared so that it might contain 30% by weight of ferroniobium powder containing 65% by weight of niobium and having a grain size of 100 to 200 mesh and 2% by weight of niobium fluoride (NbF$_5$) powder having a grain size of 100 to 200 mesh, the balance being alumina powder. It was fluidized by argon gas having a pressure of 1.5 kg/cm$^2$ at the gas inlet to the furnace and a flow rate of 100 cm per minute in the furnace. The fluidized coating agent was used for coating alloy tool steel ( JIS SKD11 ) by repeating the procedure of EXAMPLE 2. The steel as treated had a very smooth surface which was completely tree from any adhering particle of the coating agent. A microscopic examination of its cross section revealed a uniform coating layer having a thickness of 2 to 3 $\mu$m, as shown by the microphotograph of FIG. 11. The X-ray diffractron of the layer confirmed that it was a layer of niobium carbide (NbC).

What is claimed is:

1. A method of using a fluidized bed to form a carbide layer on the surface of a carbon-containing article, which comprises the steps of:
    (a) disposing the article and a coating agent in a fluidized bed furnace,
    (b) introducing a fluidizing gas into the furnace under heat to fluidize the coating agent, and
    (c) heating the coating agent to a treating temperature in the range of from 700° to 1200° C.

said coating agent comprising:
    a fluidizable refractory powder,
    a carbide-forming powder composed of at least one carbide-forming metal or alloy and
    a halide powder composed of at least one of a halogenated ammonium salt and a metal halide which is sublimable or vaporizable at a temperature which is not in excess of the treating temperature.

2. A method according to claim 1, wherein said coating agent contains 5 to 50% by weight of said carbide forming powder and 0.2 to 3% by weight of said halide powder, the balance being said refractory powder.

3. A method according to claim 1, wherein said refractory powder comprises at least one of alumina, silicon oxide, titanium oxide and zirconia.

4. A method according to claim 1, wherein said carbide forming metal is at least one member selected from the group consisting of titanium, vanadium, niobium, tantalum, chromium, molybdenum, tungsten and manganese.

5. A method according to claim 1, wherein said halogenated ammonium salt is at least one member selected from the group consisting of ammonium chloride, ammonium bromide, ammonium iodide and ammonium fluoride.

6. A method according to claim 1 wherein step (c) precedes step (b).

7. A method according to claim 1, wherein said coating agent has a grain size of 60 to 350 mesh.

8. A method according to claim 1, wherein said fluidizing gas is an inert gas which is nonreactive with said coating agent.

9. A method according to claim 8, wherein said fluidizing gas is argon.

10. A method according to claim 1, wherein said fluidizing gas has a flow rate of at least 50 cm per minute in said furnace.

11. A method according to claim 10, wherein said flow rate is in the range of 50 to 700 cm per minute.

12. A method according to claim 11, wherein said flow rate is in the range of 60 to 600 per minute.

13. A method according to claim 1, wherein said fluidizing gas has a pressure of 0.5 to 2 kg/cm$^2$ at an inlet of said furnace.

14. A method according to claim 1, wherein said article is formed of a material selected from the group consisting of iron, nickel, cobalt, or an alloy thereof, each containing carbon, a cemented carbide and graphite.

15. A method according to claim 1, wherein said article contains at least 0.1% by weight of carbon.

16. A method according to claim 1, wherein the treating temperature is in the range of from 700° C. to 1200° C.

17. A method according to claim 16, wherein said metal halide is at least one member selected from the group consisting of titanium fluoride, vanadium fluoride, vanadaium chloride, titanium bromide and ferric chloride.

18. A method according to claim 1, wherein said article is heated for 0.5 to 16 hours.

19. A method according to claim 1, wherein coarse particles of refractory powder having a grain size of 5 to 20 mesh are further disposed in said furnace between a gas inlet thereof and said coating agent, thereby preventing said gas inlet from being closed due to said coating agent.

20. A method according to claim 2, wherein said coating agent has a grain size of 60 to 350 mesh, said flow rate is in the range of 50 to 700 cm per minute, and said temperature is in the range of 700° C. to 1200° C.

21. A method according to claim 20, wherein said fluidizing gas is argon.

22. A method according to claim 21, wherein said coating agent comprises chromium powder, ammonium bromide powder and alumina powder.

23. A method according to claim 21, wherein said coating agent comprises ferrotitanium powder, titanium fluoride powder and alumina powder.

24. A method according to claim 21, wherein said coating agent comprises ferrovanadium powder, vanadium chloride powder and alumina powder.

25. A method according to claim 21, wherein said coating agent comprises ferrovanadium powder, ammonium chloride powder and alumina powder.

26. A method according to claim 1 wherein the metal halide is at least one member selected from the group consisting of titanium fluoride, vanadium fluoride, vanadium chloride, titanium bromide, ferric chloride and an equivalent metal halide.

* * * * *